United States Patent [19]

Bozoarth et al.

[11] Patent Number: 4,545,947

[45] Date of Patent: Oct. 8, 1985

[54] METHOD OF STRENGTHENING POLYPROPYLENE HOSE

[75] Inventors: David B. Bozoarth, St. Joseph Township, Berrien County; William R. Rickel, Royalton Township, Berrien County, both of Mich.

[73] Assignee: Whirlpool Corporation, Benton Harbor, Mich.

[21] Appl. No.: 557,339

[22] Filed: Dec. 2, 1983

[51] Int. Cl.⁴ .................. B29C 17/00; B29D 23/04
[52] U.S. Cl. .................. 264/150; 264/209.2; 264/209.3; 264/234; 264/339; 264/345
[58] Field of Search .................. 264/209.2, 209.3, 310, 264/340, 232, DIG. 52, 286, 287, 285, 280, 288.4, 288.8, 291, 292, 234, 345, 339, 150

[56] References Cited

U.S. PATENT DOCUMENTS 2,528,528 11/1950 Lyon .
2,920,352 1/1960 Miller et al. .
3,089,187 5/1963 Wolfe .................. 264/210.2
3,205,289 9/1965 Carpenter .................. 264/280
3,234,312 2/1966 Jordan .................. 264/80
3,470,583 10/1969 Denyes et al. .
3,491,928 1/1970 Boultinghouse .
3,843,435 10/1974 Strom .
3,919,367 11/1975 Maroschak .................. 264/209.3

FOREIGN PATENT DOCUMENTS 2736933 2/1979 Fed. Rep. of Germany ...... 264/339

Primary Examiner—Donald Czaja
Assistant Examiner—Mary Lynn Fertig
Attorney, Agent, or Firm—Hill, Van Santen, Steadman & Simpson

[57] ABSTRACT

A method of treating polypropylene hose to increase its strength and durability is provided by flexing the hose through a plurality of 360 degree rotations while in a bent form to alternately axially compress and extend portions of the hose to increase the molecular alignment of the polypropylene.

6 Claims, 7 Drawing Figures

METHOD OF STRENGTHENING POLYPROPYLENE HOSE

BACKGROUND OF THE INVENTION

1. Field of the Invention

The present invention relates to a method of strengthening tubular plastic material and more specifically for strengthening polypropylene hose which is used in automatic washers.

2. Description or the Prior Art

Deforming plastic materials to change some of the characteristics of those materials is shown by the prior art.

U.S. Pat. No. 2,528,528 discloses a method for forming a plastic wheel cover which includes extruding a rod-like plastic member and passing it warm through a helical tube to form a plastic member which is thereafter cut and welded to produce a circular member which is formed into a plate-like sheet.

U.S. Pat. No. 2,920,352 discloses that the drawing and stretching of thermal plastic organic polymers can make permanent changes in the molecular orientation and thereby increase the physical properties of the polymer.

U.S. Pat. No. 3,470,583 discloses the use of a pair of rollers placed at an angle to the direction of travel of thinning filaments to produce a false twisting in a spun filament.

U.S. Pat. No. 3,491,928 discloses passing an oriented film through spaced apart parallel plates wherein one of the plates is reciprocated at a frequency and amplitude sufficient to cause the advancing film to break into fibers.

U.S. Pat. No. 3,843,435 discloses a process for making continuous tubular hoses wherein the hose is rotated and pulled over an annulus to expand it and is passed through a curing zone after the deposition of a strengthening layer of randomly oriented fibers.

SUMMARY OF THE INVENTION

The present invention provides a method for increasing the strength and durability of polypropylene hose including the steps of flexing warm corrugated hose through several 360 degree rotations to better align the molecular structure of the polypropylene. The flexing mechanism is positioned and located to flex each convolution just after the hose issues from a corrugator to assure that the hose is flexed while still warm. The hose must be flexed through 360 degrees a plurality of times to obtain the best molecular alignment.

The flexing of the hose can occur either before or after the hose is cut to length just so long as it occurs while the hose is still at an elevated temperature (at least 110° F.). If the hose is first cut, then the entire piece can be rotated with a constantly changing portion of the hose being bent at an angle to provide the necessary flexing.

If the hose is flexed in a continuous form, one method of providing the appropriate flexing would be to secure two points in the hose length against rotation while a portion intermediate those points is rotated through 360 degrees a plurality of times. As this occurs, the entire hose length is continuously advanced to provide for uniform flexing throughout the length of the hose tube.

DESCRIPTION OF THE PREFERRED EMBODIMENT

Extruded polypropylene hose is used in automatic washers to connect water inlet conduits of the machine to water supply lines where the machine is located. The hose is generally corrugated to facilitate bending of the hose and to provide limited movement of the washer relative to the fixed supply lines. Oftentimes the machines are moved excessively or are pushed up against an adjacent wall thereby causing excessive wear to the hose which can result in the hose forming kinks and restricting the flow of water. The present invention provides a method of increasing the strength and durability of this polypropylene hose so that it will have a greater resistance to wear and kinking.

The method of increasing the strength and durability of the hose consists of flexing the hose so that each portion of the hose is alternately stretched and compressed in an axial direction a plurality of times. This flexing causes a molecular alignment in the polypropylene resulting in increased strength and durability.

Figure 1:
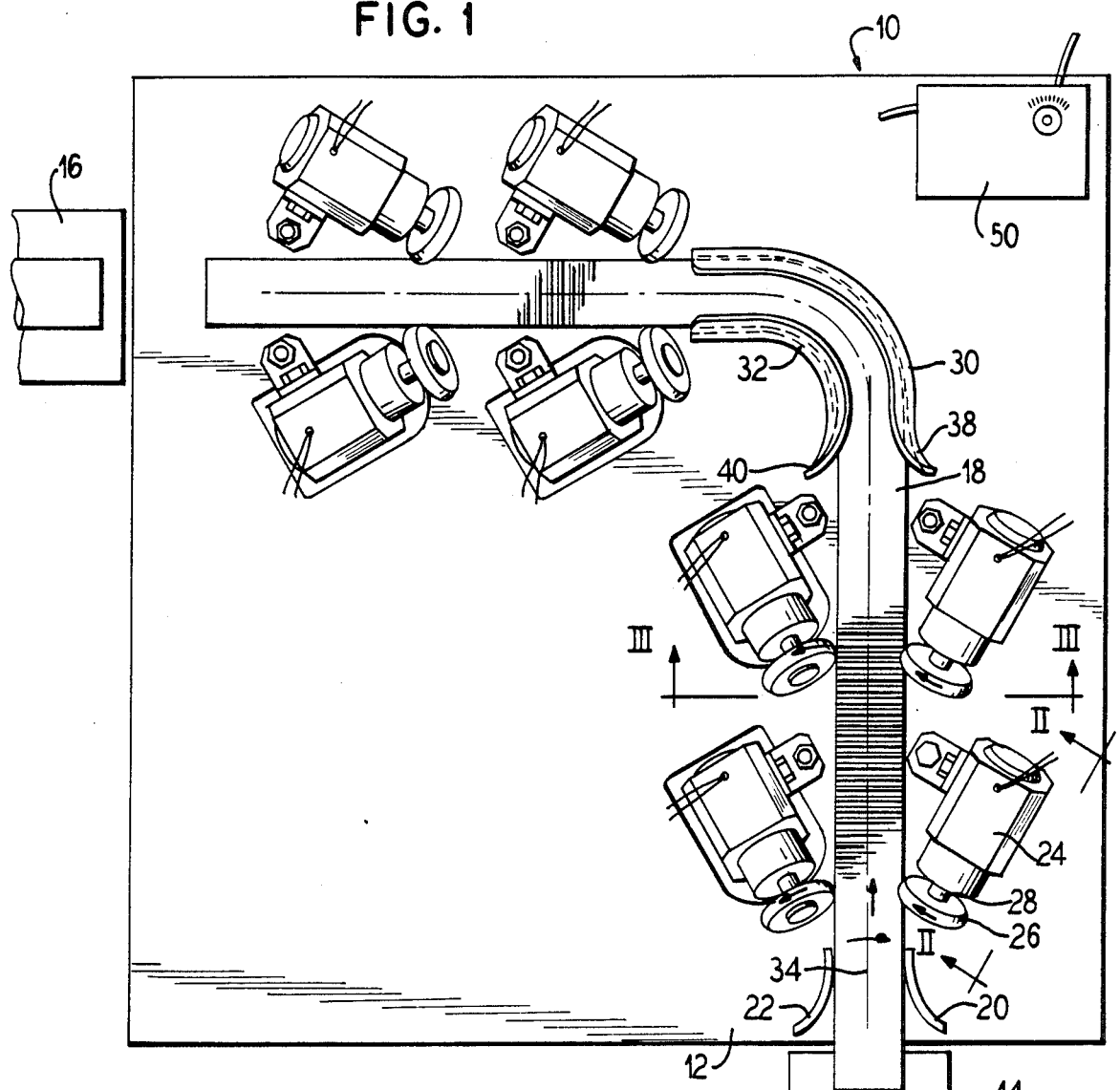
FIG. 1 is a top plan view of a device capable of practicing the method of the present invention.

In FIG. 1. there is depicted a flexing mechanism 10 for carrying out the method of the present invention. The flexing mechanism 10 includes a table 12 which is positioned adjacent an input conveyor belt 14 and a perpendicularly disposed output conveyor belt 16. Precut sections of polypropylene hose 18 are carried on conveyor belt 14 toward the table 12. The polypropylene hose is first extruded into a hose form, passed through a corrugator device and cut to length, all at an elevated temperature of at least 110 degrees F. (43 degrees C.) prior to being moved toward the table 12 on conveyor 14. Near the edge of the table there are positioned right and left guide means 20, 22 which direct the hose along a desired path.

Mounted on the table 12 are two sets of fours motors 24 which each carrying a rubber wheel 26 on the end of a rotating drive shaft 28. The motors 24 are positioned in opposed pairs on the table 12 so that the rubber wheels 26 protrude slightly into the path of the polypropylene hose.

Interposed between the two set of motors are two side guides 30, 32 which cause the hose 18 to bend 90 degrees along a path directed toward the output conveyor 16.

Figure 2:
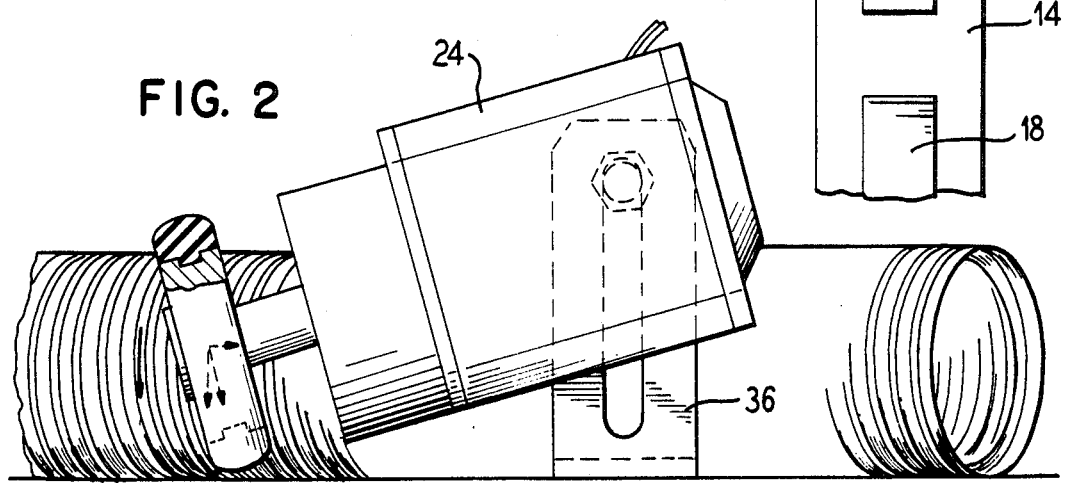
FIG. 2 is a side elevational view of a portion of the device taken generally along the lines II—II of FIG. 1.
Figure 3:
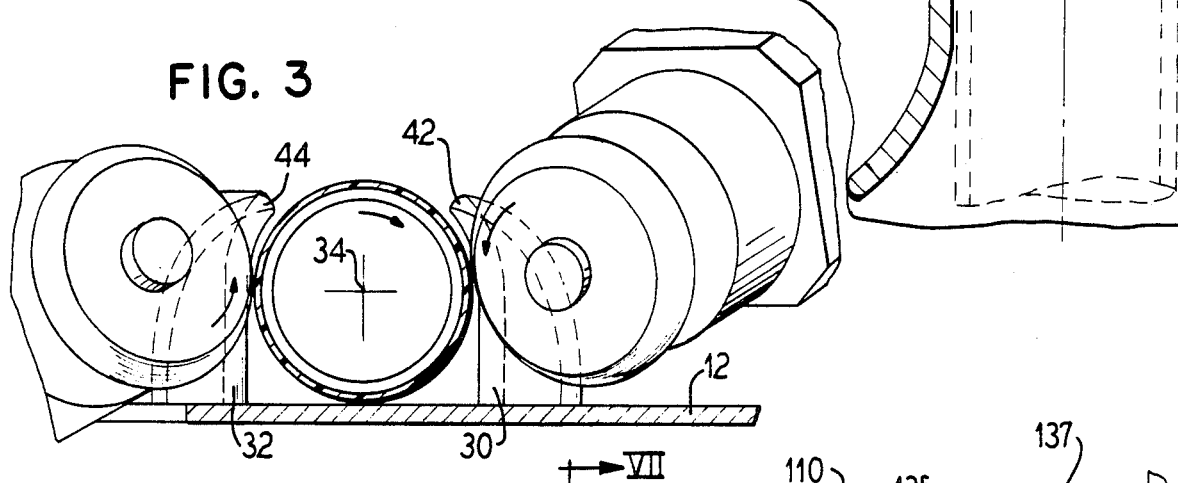
FIG. 3 is a sectional view of the device taken generally along the lines III—III of FIG. 1.

As seen in FIGS. 2 and 3 the motors are tilted and angled inwardly toward a center axis 34 of the hose 18 thereby imparting rotational motion to the hose as well as axial movement. The motors 24 may be adjustably mounted on a bracket 36 to allow for varying the ratio of the speed of rotation and the speed of axial movement.

Thus, as the hose length 18 is fed to the flexing mechanism 10 by the conveyor belt 14, the hose passes through the guide means 20, 22 and is "grabbed" by the first pair of rotating wheels 26 which cause the hose to rotate and advance. The front edge of the hose proceeds toward the second pair of rotating wheels 26 and then toward the side guide means 30, 32. As best seen in FIGS. 2 and 3, the side guides are provided with a flared opening 38, 40 to accommodate any deviation of the rotating hose from the desired path. As the hose advances between the side guides 30, 32 it is held down against the table 12 by a curved upper portion of the guides 42, 44.

Figure 4:
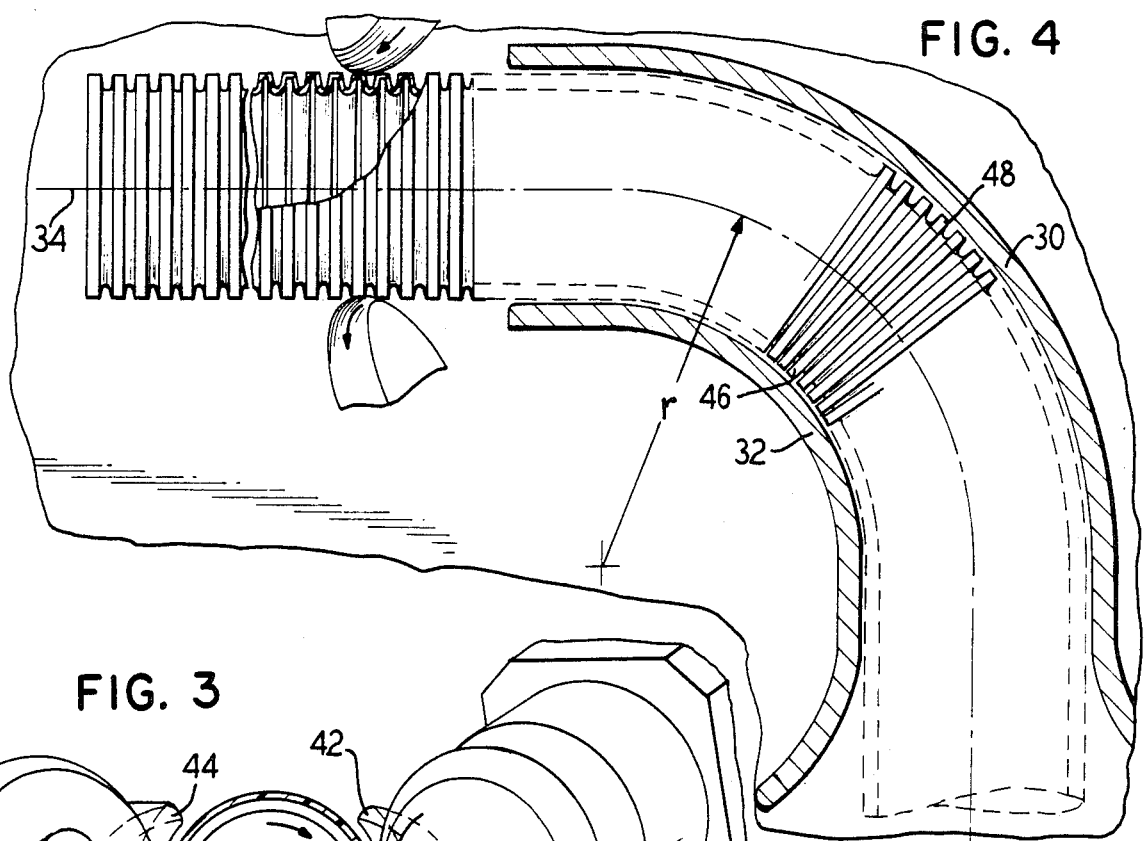
FIG. 4 is a top sectional view of the bend inducing portion of the device of FIG. 1.

As best seen in FIG. 4, as the hose 18 advances through the side guides 30, 32 the portion of the hose adjacent the inside of the curve of the guides, designated at 46, is axially compressed while the side of the hose at the outside of the curve, designated at 48, is axially extended. It will be seen that as the hose advances and rotates while passing between the side guides 30, 32 any particular point on the hose is rotated in a helical manner between an area of compression and an area of elongation. The motors and associated rubber wheels are positioned so that the hose rotates faster than it advances to allow each particular portion of the hose to be flexed a plurality of times as it passes between the side guides 30, 32.

The motors 24 are connected to a control means 50 which controls the speed of the motors and thus the speed of rotation and axial movement of the hose 18 through the flexing device 10.

As the hose passes beyond the side guides 30, 32 it is again "grabbed" by pairs of rotating rubber wheels 26 and is directed toward the output conveyor 16 which carries the molecularly aligned polypropylene hose to a point of further utilization.

The entire flexing process takes place at or above the elevated temperature mentioned above in order to achieve the requisite molecular alignment.

Figure 5:
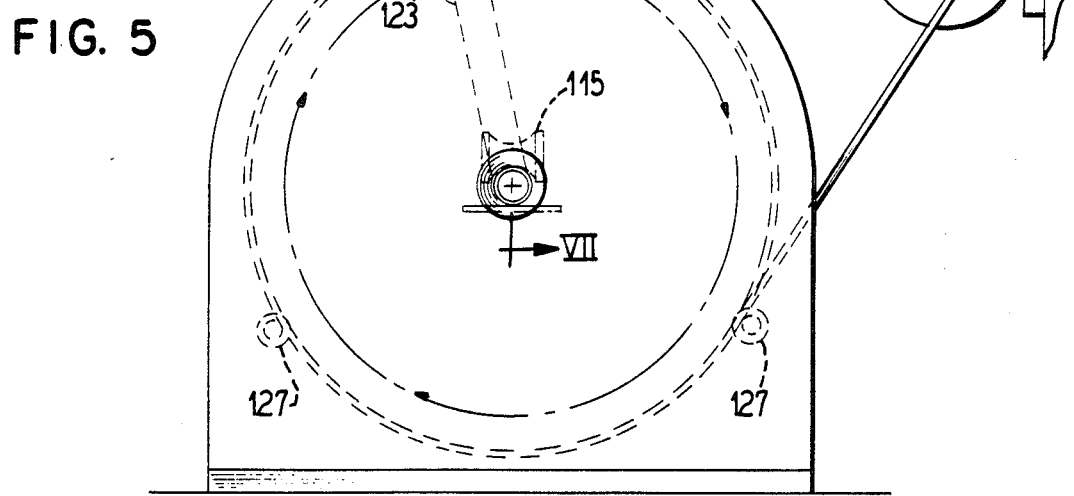
FIG. 5 is an end elevational view of an alternate device capable of praticing the method of the present invention.
Figure 6:
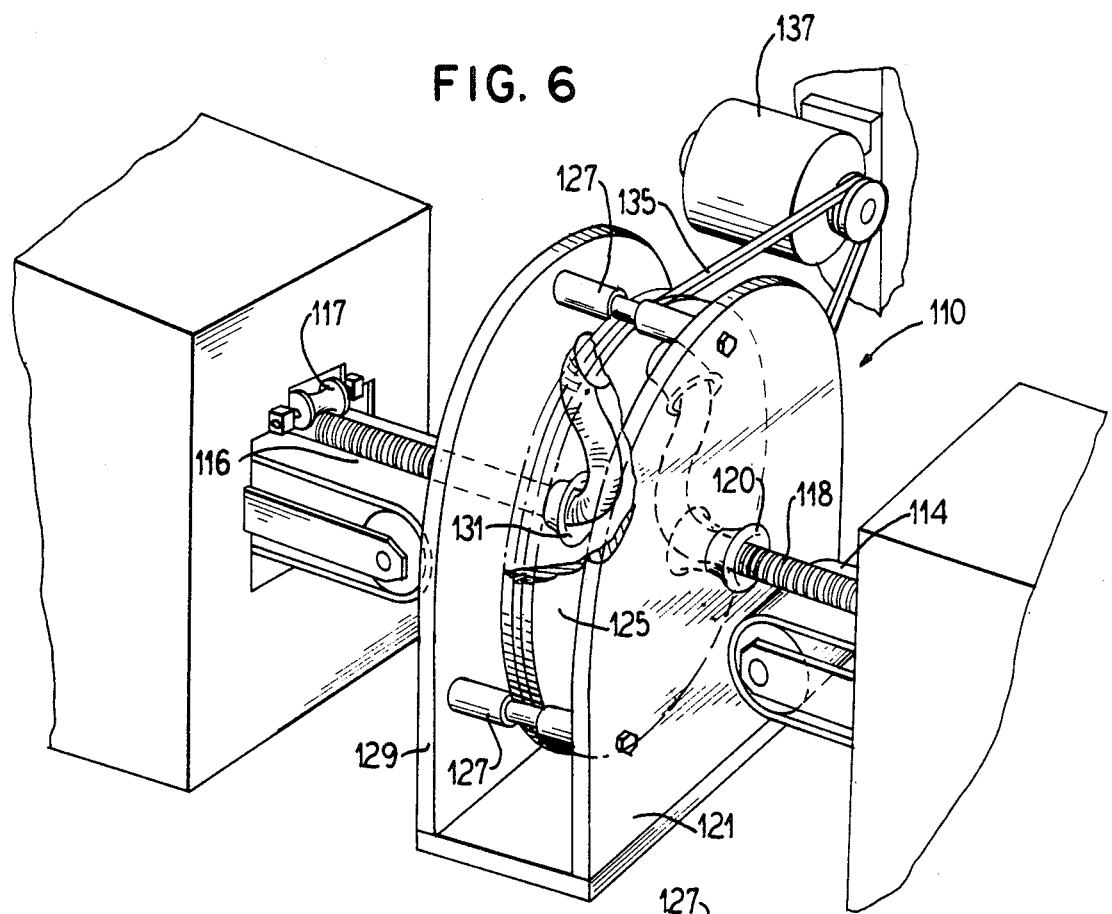
FIG. 6 is a perspective view of the device shown in FIG. 5.
Figure 7:
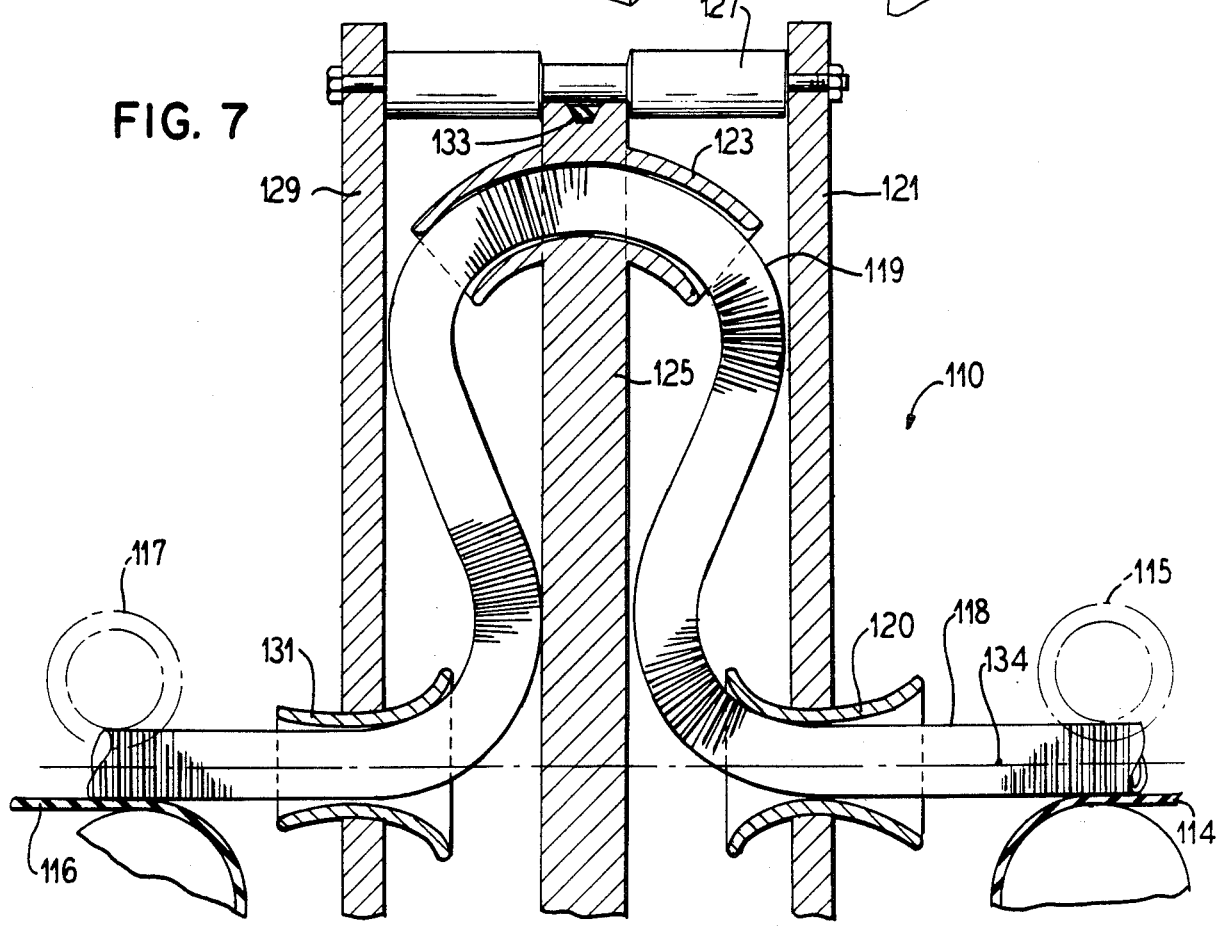
FIG. 7 is a side sectional view of the device taken generally along the lines VII—VII of FIG. 5.

In FIGS. 5, 6 and 7 there is shown another flexing structure 110 for practicing the invention. With this device, the warm corrugated polypropylene hose 118 is fed through the device in a continuous form and is not cut to length until after it has passed through the flexing device 110. An input conveyor 114 feeds the continuous length of hose 118 into the flexing device 110 and an output conveyor 116 carries the hose away. A contoured roller 115 is positioned above the input conveyor 114 where it engages the hose 118 and prevents the hose from rotating about the hose axis 134. A similar roller 117 is associated with the output conveyor 116 to prevent the outgoing portion of the hose 118 from rotating about the hose axis.

An intermediate portion of the hose 119 is passed through a stationary inlet guide 120 carried on a frame member 121 and is passed through a curved bending guide 123 formed in a pulley member 125 which is rotatably supported by a plurality of pins 127 secured at one end to the frame member 121 and at a second end to a second frame member 129. The hose then extends through an outlet guide 131 throrgh frame member 129 to be directed toward the output conveyor 116 and roller 117. The pulley 125 has a circumferential groove 133 within which is received an endless belt 135 driven by an electric motor 137. As the motor rotates, the pulley is caused to rotate on pins 127. The hose 118 is prevented from rotating about its axis 134 and thus a portion of the hose which faces downwardly continues to face downwardly as the hose is fed through the flexing device 110 by the conveyors 114, 116. This downwardly facing portion of the hose which is positioned within the bending guide 123 is axially compressed when the bending guide 123 is at its highest position as shown in FIG. 7, and this portion of the hose is axially elongated when the bending guide 123 is at its lowest position. The speed of the motor 137 and the conveyor belts 114, 116 are adjustable so that each portion of the hose 118 is flexed through this 360 degree rotation a plurality of times as the hose 118 passes through the flexing device 110. In this manner, the molecular alignment is achieved.

As is apparent from the foregoing specification, the invention is susceptible of being carried out by a variety of devices which may differ particularly from those that have been described in the preceeding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. The method of enhancing the molecular alignment of polypropylene hose comprising the steps:
   extruding polypropylene into a hose shape at an elevated temperature,
   forming corrugation in the hose,
   advancing said hose through a bend, and
   relatively rotating said hose or said bend through a plurality of 360 degree rotations while continuously advancing said hose through said bend.

2. The method of claim 1, including the step of cutting said hose to length prior to flexing it.

3. The method of claim 2 wherein said step of relatively rotating said hose in said bend comprises rotating said hose in a fixed bend guide.

4. The method of claim 1, including the step of cutting said hose to length after flexing it.

5. The method of claim 4 wherein said step of relatively rotating said hose or said bend comprises the steps of securing portions of said hose on opposite sides of said bend against rotation and rotating said bend through said 360 degree rotations.

6. The method of 1, wherein said bend is at an angle of at least 90 degrees.

* * * * *